Oct. 28, 1969  R. A. DUHAIME ET AL  3,474,953
VACUUM CREATING DEVICE
Original Filed June 7, 1967
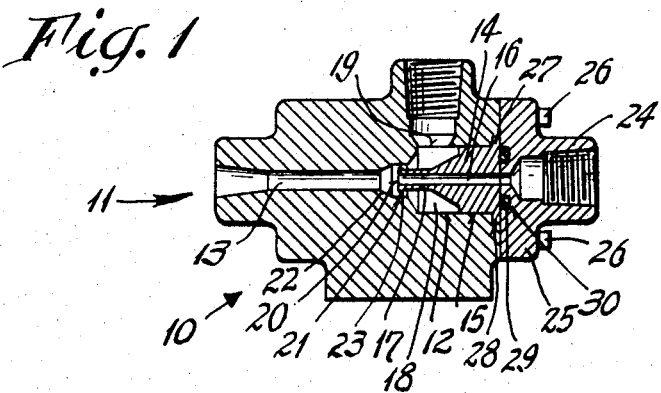
Fig. 1
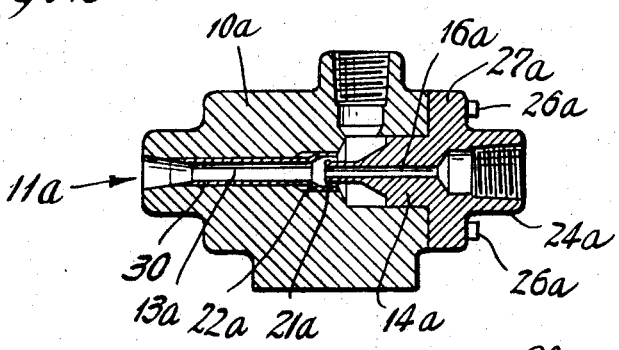
Fig. 2
Fig. 3
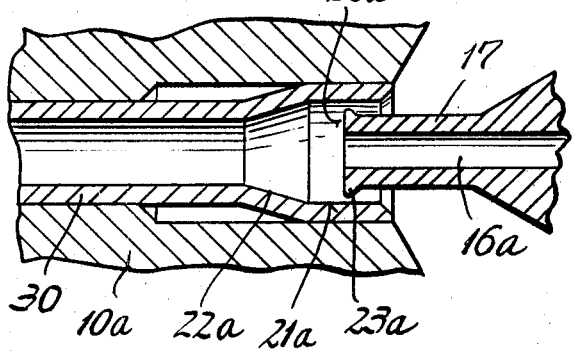
Fig. 4
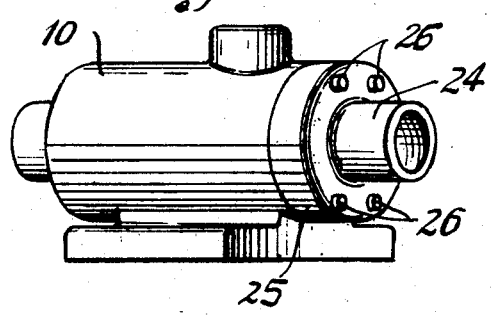
INVENTORS
Raymond A. Duhaime
Clifford S. Lasto
Stephen W. Lasto
BY Johnson and Kline
ATTORNEYS United States Patent Office 3,474,953
Patented Oct. 28, 1969

3,474,953
VACUUM CREATING DEVICE
Raymond A. Duhaime, Huntington, Clifford S. Lasto, Orange, and Stephen W. Lasto, Huntington, Conn., assignors to Air-Vac Engineering Company, Incorporated, Milford, Conn., a corporation of Connecticut
Continuation of application Ser. No. 644,233, June 7, 1967. This application Mar. 5, 1969, Ser. No. 806,030
Int. Cl. F04f 5/16, 5/24, 5/44
U.S. Cl. 230—95                                       2 Claims

ABSTRACT OF THE DISCLOSURE

The vacuum creating device for producing a suction is formed of sturdy parts which can be readily made and assembled to provide the required circular orifice adjacent a large air chamber which receives air from a source of air under pressure with a minimum of resistance to the flow thereof and feeds it under uniform pressure through a fixed diameter circular orifice in order to create the desired vacuum.

---

This application is a continuation of application Ser. No. 644,233, filed June 7, 1967, now abandoned.

This invention is an improvement over our U.S. Patent 3,031,127 wherein nested sleeves are employed in conjunction with a pair of small air chambers connected by restricted ports which provided resistance to the flow of air under pressure from the source and through the gap. The structure of the sleeves and the assembly thereof made the device relatively costly to produce.

The present invention provides a vacuum creating decice which has rugged elements in the form of a body having a smooth stepped bore and a cooperating plug which can be readily made and assembled. The plug is shaped to cooperate with a rear bore in the body to form a large air chamber therebetween directly communicating with a port connected to a source of air or other suitable gas under pressure. The plug has a suction bore therethrough aligned with a forward exhaust bore in the body and has a forward end disposed in spaced relation in an enlargement of the exhaust bore adjacent the air chamber to provide a gap forming a circular orifice through which air flows uniformly from said air chamber creating a vacuum producing a suction in the bore in the plug.

A minimum of elements are used which can be readily made and assembled at a relatively lower cost without decreasing the efficiency of the device.

Other features and advantages of the invention will be apparent from the specification and claims when considered in connection with the accompanying drawings in which:

FIGURE 1 is a longitudinal sectional view of one form of the invention.

FIG. 2 is a longitudinal sectional view of another form of the invention.

FIG. 3 is a fragmentary enlarged view of the liner and end of the plug as shown in FIG. 2.

FIG. 4 is a perspective view of the device of the present invention.

As shown in the drawings the device of the present invention comprises a body 10 which can be cast or molded of suitable metal or plastic resins and is provided with a smooth stepped bore 11 therethrough. The rear-plug-receiving portion 12 of the bore is substantially larger in diameter than the forward exhaust portion 13 of the bore. A plug 14, which can be cast or molded from suitable metal or plastic or machined from bar stock, has a rear diameter 15 slidably engaging the rear bore of the body to close the same. The plug has a suction bore 16 therethrough aligned with the exhaust bore 13 of the body.

The forward portion 17 of the plug is of reduced diameter and when the plug is inserted in the body cooperates with the rear bore thereof to form a large air chamber 18. The air chamber directly communicates with an inlet port 19 which is connected to a source of air or the like gas under pressure (not shown). The end 20 of the forward portion is positioned in an enlargement 21 of the exhaust bore in the body, which enlargement is connected to the remainder of the exhaust bore by a tapered wall section 22, preferably of about 15°. The end of the plug, which preferably has a bead 23 thereon, is located rearwardly of the tapered wall section and in spaced relation with the walls of the enlargement so as to provide a gap therebetween forming a circular orifice through which air from the air chamber passes and in doing so creates a vacuum. This produces a suction in the bore 16 in the plug which can be connected by a nipple 24, carried by an end cap 25 secured to the body by bolts 26, to any device requiring suction.

As shown in FIG. 1, the plug 14 has a flange 27 projecting at the end thereof which is engaged by the end cap 25. Preferably the flange is seated in an annular recess 28 formed in the body surrounding the rear bore. The face of the end cap has a sealing means therein which sealingly engages the end of the plug so that if air inadvertently passes from the air chamber rearwardly along the engaging surfaces of the plug and body it will be sealed from passing into the suction bore and to the device requiring suction. In the illustrated form of the invention the seal comprises an O-ring 29 positioned in an annular recess 30 in the face of the cap.

It will be seen that the elements involved are of substantial mass, can be readily made and handled in the assembly thereof which reduces the cost over the prior devices and also provides a large air chamber which produces a more uniform pressure on the air or gas passing through the orifice so as to create a more uniform and accurate vacuum producing the required suction in the suction passage.

In some instances where the body of the device may be made of a material which cannot be readily machined or which cannot hold its tolerances, the device of FIG. 2 can be provided. In this form of the invention the body 10a has the stepped bore 11a therethrough and the plug 14a is provided. However, the integral flange 27a on the end of the plug is enlarged and forms the cover cap having the nipple 24a. The plug is accurately positioned and held in position by the engagement of the flange with the end of the body by bolts 26a. Further, since the plug and end cap are one, a sealing means is not required since air passing between the body and plug cannot enter the suction bore 16a.

In order to secure the smooth and accurate exhaust bore, the present invention provides a liner 30 formed from a tube of metal which can be readily polished and accurately shaped to provide the enlargement 21a, the tapered wall surface 22a and the remainder of the exhaust bore 13a. As shown in FIG. 3 this can be held accurately in the bore and, with cooperation of the end 20a and the bead 23a thereon, will produce the required circular orifice for creating the vacuum and producing the desired suction.

Variations and modifications may be made within the scope of the claims and portions of the improvements may be used without others.

What is claimed is:

1. A vacuum creating assembly comprising a body having a smooth stepped bore extending therethrough comprising a forward exhaust bore and a rear inner-plug-positioning bore of larger diameter, an inner plug having a diameter adjacent the rear portion thereof to slidably fit within and close the rear inner-plug-positioning bore of the body and having a flange at the rear end thereof to engage the end of the body to accurately position the plug in said bore, means holding said plug in said position, said plug having a bore therethrough forming a vacuum passage aligned with the exhaust bore in the body and having a forward portion of the plug of a reduced diameter with respect to said rear bore of the body so as to form a large annular air chamber therebetween, means connecting the side of said chamber to a supply of air under pressure, the end of the forward portion of the plug being cylindrical and disposed within a cylindrical enlargement of the exhaust bore adjacent the air chamber, said enlargement being connected to the remaining forward section of the exhaust bore by a tapered portion, said end of the plug being located in spaced relation within the axial confines of said enlargement to provide a fixed gap forming a fixed circular orifice at any position therebetween throughout the full axial extent of said enlargement so that air from said chamber passing through said orifice and into said exhaust bore will create a vacuum in the vacuum passage in the plug.

2. The invention as defined in claim 1 wherein the forward exhaust bore in the body is provided with an accurately formed metal liner.

References Cited
UNITED STATES PATENTS

| | | | |
|---|---|---|---|
| 1,158,690 | 11/1915 | Jones | 103—258 |
| 2,223,242 | 11/1940 | Sweet | 230—95 |
| 2,382,391 | 8/1945 | Berman | 103—260 |
| 2,595,737 | 5/1952 | Von Rotz | 103—260 |
| 2,631,774 | 3/1953 | Plummer | 230—95 |
| 2,909,127 | 10/1959 | Bradaska | 103—260 |
| 3,031,127 | 4/1962 | Duhaime et al. | 230—95 |
| 3,175,515 | 3/1965 | Cheely | 103—262 |
| 3,283,728 | 11/1966 | Notzke | 103—263 |
| 3,291,051 | 12/1966 | Ekey | 103—262 X |
| 3,369,735 | 2/1968 | Hoffmeister | 230—95 |

DONLEY J. STOCKING, Primary Examiner
WARREN J. KRAUSS, Assistant Examiner

U.S. Cl. X.R.
103—263, 278